(12) United States Patent
Kintou et al.

(10) Patent No.: US 7,581,299 B2
(45) Date of Patent: Sep. 1, 2009

(54) METHOD OF ASSEMBLING A DAMPER UNIT

(75) Inventors: Yoshio Kintou, Anjo (JP); Yoshihiko Sasaki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 11/090,842

(22) Filed: Mar. 25, 2005

(65) Prior Publication Data

US 2005/0160596 A1    Jul. 28, 2005

Related U.S. Application Data

(62) Division of application No. 10/170,633, filed on Jun. 14, 2002, now Pat. No. 7,238,111.

(30) Foreign Application Priority Data

Jun. 26, 2001    (JP) .............................. 2001-192854

(51) Int. Cl.
    *B23P 11/02* (2006.01)
(52) U.S. Cl. ...................... 29/451; 192/55.1; 192/214.1; 464/46
(58) Field of Classification Search .................... 464/45, 464/46, 68.4; 192/55.1, 56.61, 214, 214.1; 29/451; 74/473.1, 473.29
See application file for complete search history.

(56) References Cited

U.S. PATENT DOCUMENTS

| 1,756,428 A | 4/1930 | Jones |
| 3,323,328 A * | 6/1967 | Montgomery ................ 464/46 |
| 4,815,189 A | 3/1989 | Ijames et al. |
| 4,892,177 A | 1/1990 | Lanzarini et al. |
| 5,123,510 A | 6/1992 | Beccaris et al. |
| 5,362,276 A * | 11/1994 | Fuehrer et al. ............... 464/160 |
| 5,505,286 A | 4/1996 | Nash |
| 6,021,878 A | 2/2000 | Kosumi et al. |
| 6,582,312 B2 | 6/2003 | Suzuki et al. |
| 6,923,725 B2 * | 8/2005 | Takeuchi et al. ......... 192/109 A |
| 2003/0087704 A1 | 5/2003 | Takeuchi et al. |

FOREIGN PATENT DOCUMENTS

| JP | A-10-267114 | 10/1998 |
| JP | A-2002-13547 | 1/2002 |
| JP | A-2002-39210 | 2/2002 |
| JP | A-2002-181085 | 6/2002 |

* cited by examiner

*Primary Examiner*—David P Bryant
*Assistant Examiner*—Christopher M Koehler
(74) *Attorney, Agent, or Firm*—Oliff & Berridge, PLC

(57) ABSTRACT

The invention eliminates the need of handling an engine in a process for assembling a torsion damper which couples the engine with a power transmission system and a torque limiter. In a damper unit with a torque limiter positioned between an output shaft of an engine and a power transmission shaft of a power transmission system, the damper unit includes a fly wheel damper, a torsion damper and a torque limiter. The torque limiter of the damper unit is coupled to the torsion damper with a set load applied thereto such that the torque limiter and the torsion damper are combined to form an assembly. The torsion damper and the torque limiter can be assembled by handling, independently of the engine, only components which are smaller and lighter than an engine. This improves the efficiency of the assembling operation of the damper unit with the torque limiter.

9 Claims, 11 Drawing Sheets

METHOD OF ASSEMBLING A DAMPER UNIT

This is a Division of application Ser. No. 10/170,633, filed Jun. 14, 2002. The entire disclosure of the prior application is hereby incorporated by reference herein in its entirety.

BACKGROUND OF THE INVENTION

1. Field of Invention

The invention relates to a damper unit positioned between an output shaft of an engine and a power transmission shaft of a power transmission system, and more particularly to an art for improving the method of installing the engine onto the power transmission shaft.

2. Description of Related Art

A combustion engine (hereinafter referred to as an engine), which is a prime mover of a vehicle, uses combustion pressure generated intermittently in a cylinder as drive force of the piston and then transmits it to the output shaft to obtain drive torque. Thus, torque vibration is generated in the output shaft. Conventionally, in a vehicle in which a manual transmission is disposed in a power transmission system, to damp the torque vibration and transmit it to the power transmission system, a fly wheel, which serves as inertial mass for damping an acceleration change component of the torque vibration, is installed on an engine output shaft, and a torsion damper, which is a displacement resistor for damping a velocity change component, is incorporated in a clutch. Also, in a vehicle in which an automatic transmission is disposed in a power transmission system, a torque converter is provided with vibration damping capacity, and thus a torsion damper is incorporated in a lock-up clutch for coupling an engine output shaft and a transmission mechanism.

Recently, a hybrid type vehicle provided with an engine and a motor (where a motor, a generator and an electric generator are hereinafter referred to as a motor) as its prime mover has been put into practical use. In such a vehicle, an engine output shaft, which vibrates due to its torque, is coupled to the motor, in which its torque vibration can be substantially reduced so that they can be driven together. Because the rotor shaft of the motor has a large inertial mass, when the torque of the engine and motor changes suddenly, an excessive torsion force to which the torsion damper cannot respond may be applied between the engine output shaft and the rotor shaft. Thus, a torque limiter is additionally provided to release such an excessive torsion force through slippage between both the shafts.

Figure 11:
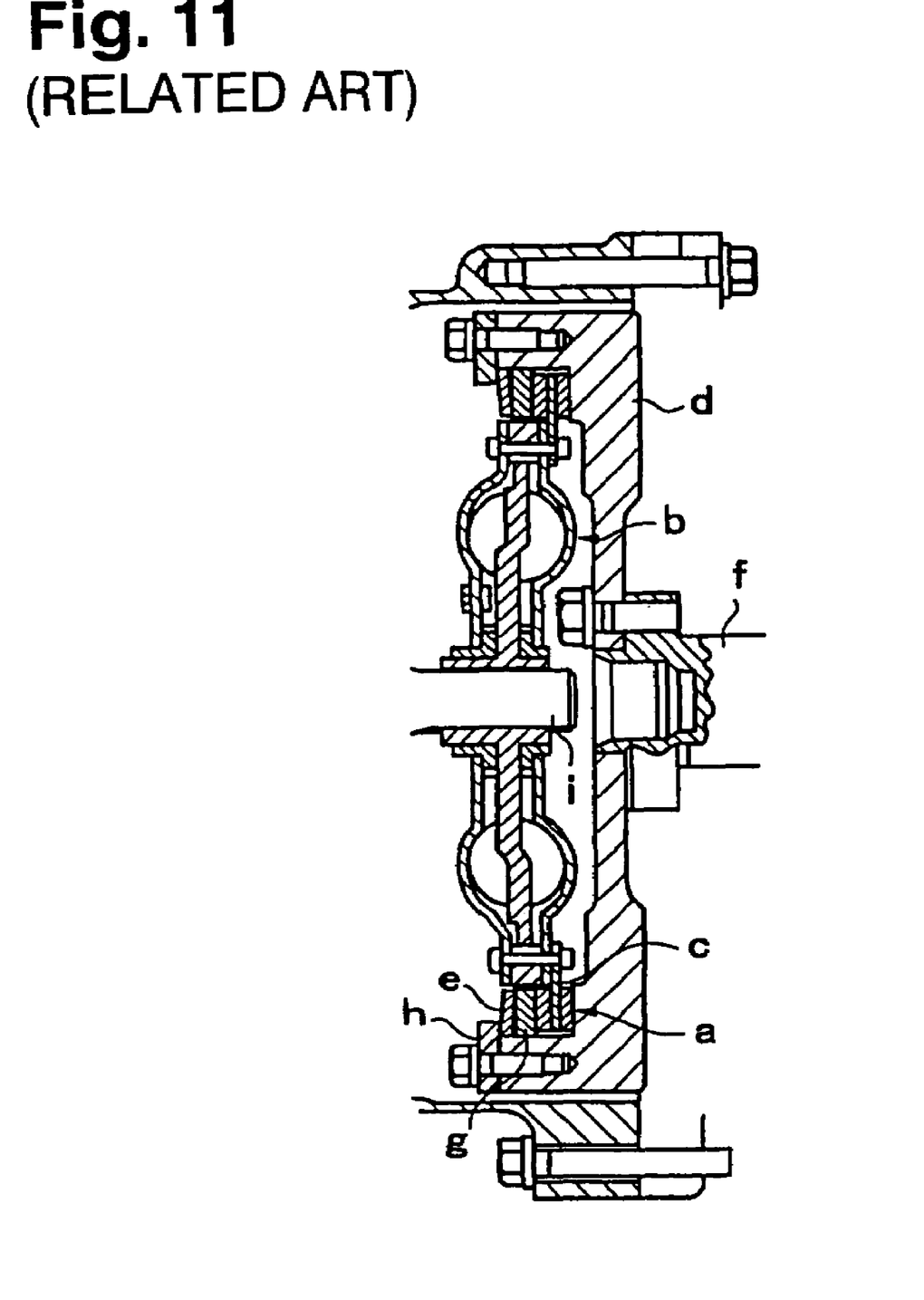
FIG. 11 is a sectional view in the axial direction showing a related damper unit with a torque limiter, as installed onto an engine output shaft.

An example of such a damper unit with a torque limiter is disclosed in Japanese Patent Laid-Open Publication No. 10-267114 and is shown in FIG. 11. As shown in FIG. 11, in a torque limiter "a" of this damper unit, a friction plate "c" is provided on an outer periphery of a torsion damper "b" in which a damper spring is positioned between two discs, like a dry type single-plate clutch in a conventional manual transmission. The friction plate "c" is pressed onto the fly wheel "d" with a spring "e". Thus, the torsion damper "b", pressure plate "g", spring "e", and stopper ring "h" are installed in this order in the fly wheel "d". Finally, they are mounted to the engine side by tightening the stopper ring "h" onto the fly wheel "d" with a bolt. Then, by coupling the power transmission shaft "i" of the power transmission system to the inner periphery of the torsion damper "b" by spline engagement, the engine and the power transmission system are assembled together. The power transmission system incorporates a motor that is assembled separately.

However, when installing the torsion damper "b" and parts "g", "e", and "h", which form torque limiter "a", onto the fly wheel "d" as described before, a fixing means for fixing the fly wheel "d" to a shaft end of the engine output shaft "f" is obstructed by the torsion damper "b". This is because the torsion damper "b", to which the power transmission shaft "i" is coupled through spline engagement, has a small inner peripheral diameter. Thus, the torsion damper "b" and the torque limiter "a" cannot be incorporated before the fly wheel "d" is installed onto the engine output shaft "f".

Therefore, according to the conventional installation process, the torque limiter "a" needs to be installed onto the fly wheel "d" by tightening a bolt while aligning, for example centering, the axis of the torsion damper. Thus, some type of special tool for centering is necessary. In addition, when each component is installed in a vertical position to avoid a deflection of each component due to gravity, it is necessary to move the engine, which is both large and heavy, or to change the installation position of each component. Therefore, installation process inefficiencies are unavoidable.

Furthermore, the torque limiter "a" does not perform its function until a set load is applied on it when installed on the fly wheel "d" by tightening a bolt. Thus, in order to evaluate the performance of the torque limiter, it is necessary to also evaluate the engine and the fly wheel "d". This leads to an inefficient component testing and evaluation process.

SUMMARY OF THE INVENTION

The present invention provides improvements over the conventional damper unit with torque limiter arrangements to improve the installation and/or evaluation processes discussed above. It is thus an objective of the invention to provide a damper unit with a torque limiter having a structure which eliminates the need of handling the engine in the process of assembling the torsion damper and the torque limiter.

BRIEF DESCRIPTION OF THE DRAWINGS

The invention will be described with reference to the drawings, in which.

DETAILED DESCRIPTION OF PREFERRED EMBODIMENTS

Figure 1:
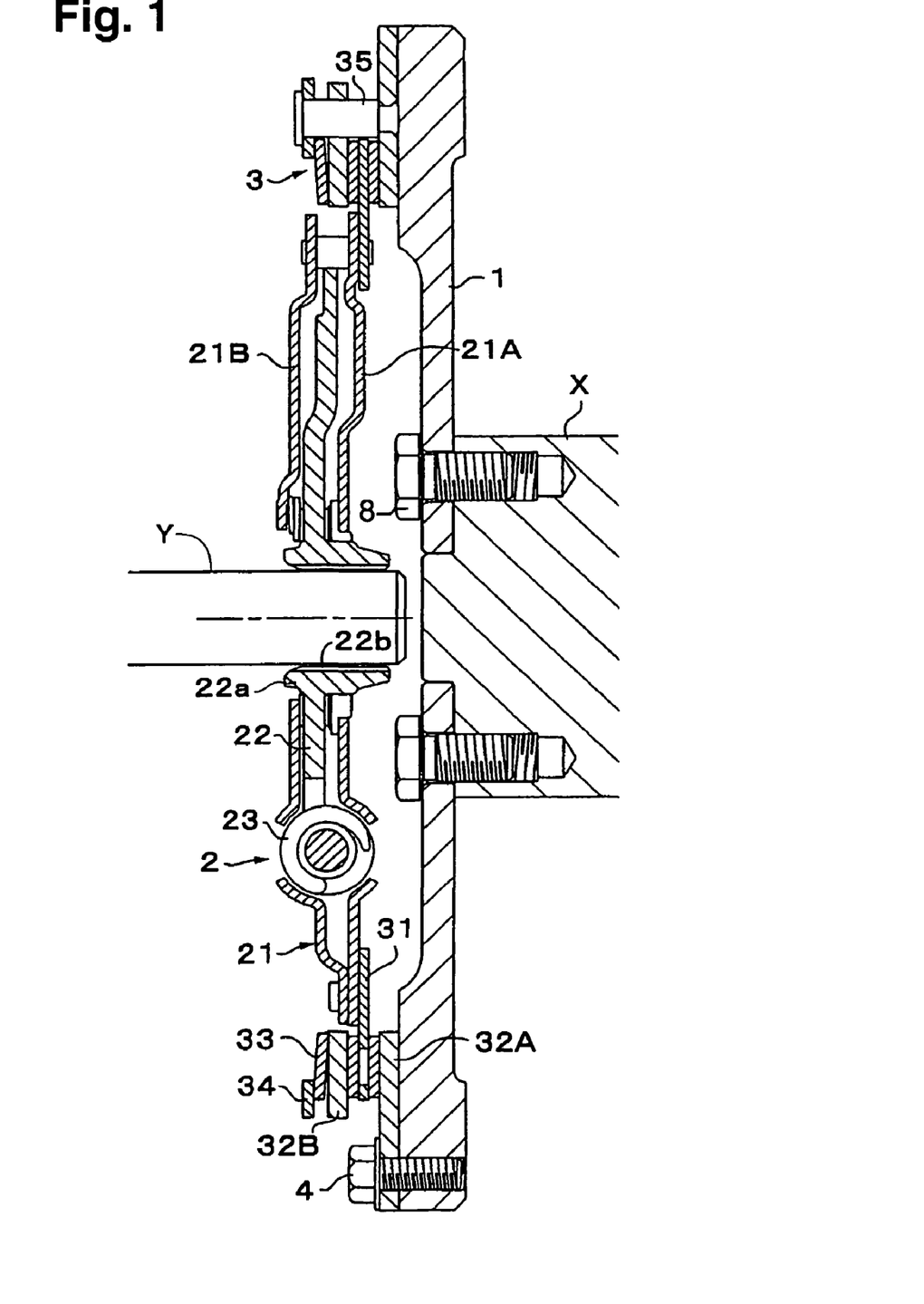
FIG. 1 is a sectional view in the axial direction showing a damper unit with a torque limiter according to a first embodiment of the invention, as installed onto an engine output shaft.
Figure 2:
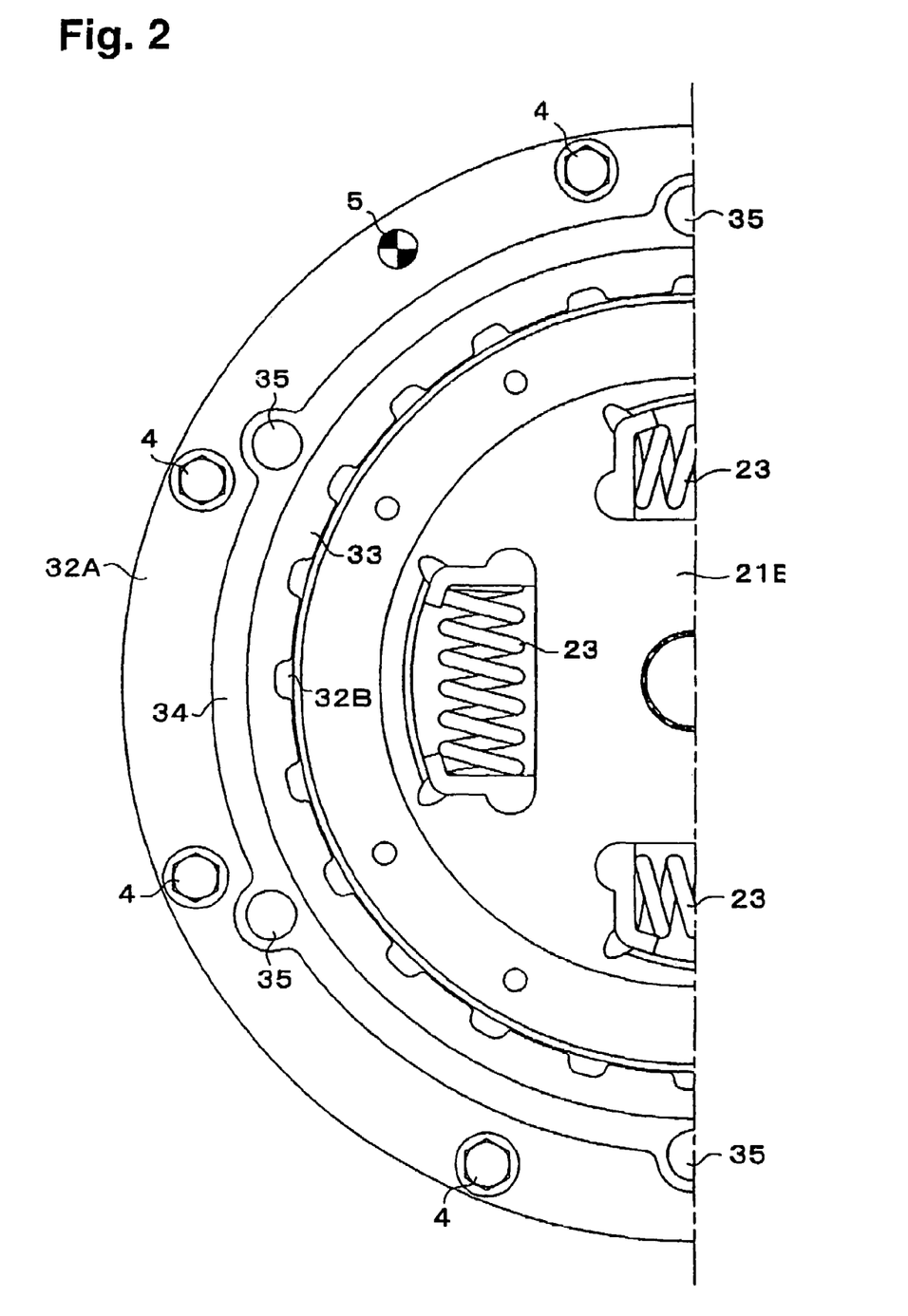
FIG. 2 is a half front view showing the damper unit with the torque limiter according to the first embodiment, as seen from the power transmission system coupling side.

Embodiments of the invention will now be described with reference to the accompanying drawings. FIGS. 1 and 2 show a first embodiment of a damper unit with a torque limiter according to the invention. As shown in FIG. 1, the damper unit is positioned between an output shaft X of an engine and a power transmission shaft Y of a power transmission system. The damper unit includes a torsion damper 2 coupled with the power transmission shaft Y of the power transmission system so as to absorb torsion vibration between both the shafts. The damper unit also includes a fly wheel 1 which is bolted to the output shaft X of the engine from the power transmission system side at a position radially outside an inner diameter of the torsion damper 2, and a torque limiter 3 for limiting torque to be transmitted between the fly wheel 1 and the torsion damper 2. The torque limiter 3 is coupled to the torsion damper 2 with a set load applied thereto and is combined with the torsion damper 2 to form an assembly. The torque limiter 3 includes a friction disc 31 coupled to the torsion damper 2, a pair of plates 32A, 32B which sandwich the friction disc 31 and are coupled with each other so that they do not rotate, an urging means 33 for pressing the pair of the plates 32A, 32B against the friction disc 31, and load setting means 34, 35 for applying the set load onto the urging means 33. According to the first embodiment, the pair of the plates 32A, 32B are coupled with each other by a separate coupling member 35, that also serves as part of the load setting means so that they do not rotate. One plate 32A has a mounting means 4 for mounting onto the fly wheel 1.

Respective components will now be described in detail. The fly wheel 1 is a disc having a thick outer periphery and a centering hole formed in its center. According to the arrangement of the mounting means 4 shown in FIG. 2, eight screw holes in which the mounting means 4 is to be tightened are arranged at equal intervals in the circumferential direction. The fly wheel 1 is centered by fitting a boss portion protruded from a shaft end of the engine output shaft X in the centering hole and tightening coupling means 8, such as, for example, a plurality of bolts, rivets, spot welds, friction welds and the like, around the centering hole so that the fly wheel 1 is fixed to an end of the engine output shaft X.

As shown in FIGS. 1 and 2, the torsion damper 2, which constitutes one element of the assembly, includes first and second damper discs 21, 22, which are coupled with each other through a torsion spring 23 having four cylindrical coil springs arranged at equal intervals in the circumferential direction. The friction disc 31 of the torque limiter 3 is mounted on the outer periphery side of the first damper disc 21. A spline 22b, which is engaged with the power transmission shaft Y of the power transmission system, is provided in an inner periphery of the second damper disc 22. The first damper disc 21 comprises of a pair of discs 21A, 21B, which sandwich the second damper disc 22. The outer peripheries of discs 21A, 21B are fixed and assembled with the friction disc 31 by riveting. The second damper disc 22 has a boss portion 22a, which is provided in its inner peripheral side and is extended in the axial direction. The spline 22b, which is engaged with the power transmission shaft Y, is formed in the inner peripheral face of the boss portion 22a.

The torque limiter 3 includes a pair of plates 32A, 32B, a friction disc 31 sandwiched therebetween, a disc-type spring representing the urging means 33 and disposed behind the other plate 32B, an annular plate representing a retainer 34 of the spring 33, and six coupling members (pins) 35. The six pins 35 couple the pair of plates 32A, 32B such that plates 32A, 32B do not rotate. The pins 35 also serve as rough centering means in the stage of assembling the friction disc 31 and the torsion damper fixed thereto by setting the disposition diameter of the six pins 35. In addition, the pins 35 achieve the function of applying a predetermined set load upon the spring 33 by setting the axial length thereof. The head of each pin 35 is in contact with the retainer 34. Each pin 35 passes through a through hole in one plate 32B and its tip is caulked in a hole in the other plate 32A. The other plate 32A is expanded in the outer diameter direction with respect to the one plate 32B, so that it coincides with the outer diameter of the fly wheel 1. Then, eight bolt through holes, which represent the mounting means 4, are formed in this expanded portion. The friction disc 31 has frictional material attached by an appropriate means on both sides on its outer peripheral side. An inner peripheral side of the friction disc 31 is riveted to the outer peripheral side of the first damper disc 21.

In such a structure, the torsion damper 2 and the torque limiter 3 are coupled with each other by the pins 35 so that they are not removed from each other, thus forming an assembly that can be handled as a integrated component. Centering of the plates 32A, 32B of the torque limiter 3 with respect to the fly wheel 1 or the engine output shaft X is performed when the assembly is mounted on the fly wheel 1 through a knock pin 5 (shown in FIG. 2), which is configured to pass through the plate 32A and the fly wheel 1. Centering of the friction disc 31 with respect to the shaft Y is performed when the inner peripheral spline 22b of the torsion damper 2 is engaged with an outer peripheral spline (not shown) of the shaft Y upon coupling of the engine with the power transmission system, and thus centering of the torsion damper 2 is performed.

By adopting such a construction in which the torsion damper 2 and the torque limiter 3 are combined as an assembly independent of the fly wheel, the torsion damper 2 and the torque limiter 3 can be assembled independently of the engine by handling only components which are by far smaller and lighter than the engine. Therefore, the operational efficiency of assembling the damper unit with the torque limiter is improved. Further, because the torque limiter 3 is combined with the torsion damper 2 to form an assembly and a set load is applied thereto, its performance as an already assembled component can be evaluated prior to its mounting on the engine. Mounting the assembly onto the fly wheel 1 can be performed by just tightening the bolts after positioning with respect to the fly wheel 1, which is preliminarily bolted to the engine output shaft by the knock pin 5. Therefore, the operation of installing the damper unit with the torque limiter onto the engine can be advantageously improved. Further, in this embodiment, since one plate 32 forming the torque limiter 3 is a mounting member for mounting the assembly onto the fly wheel 1, it is possible to minimize an increase in the number of components due to combining the torsion damper 2 and the torque limiter 3 as the assembly independent of the fly wheel 1.

Figure 3:
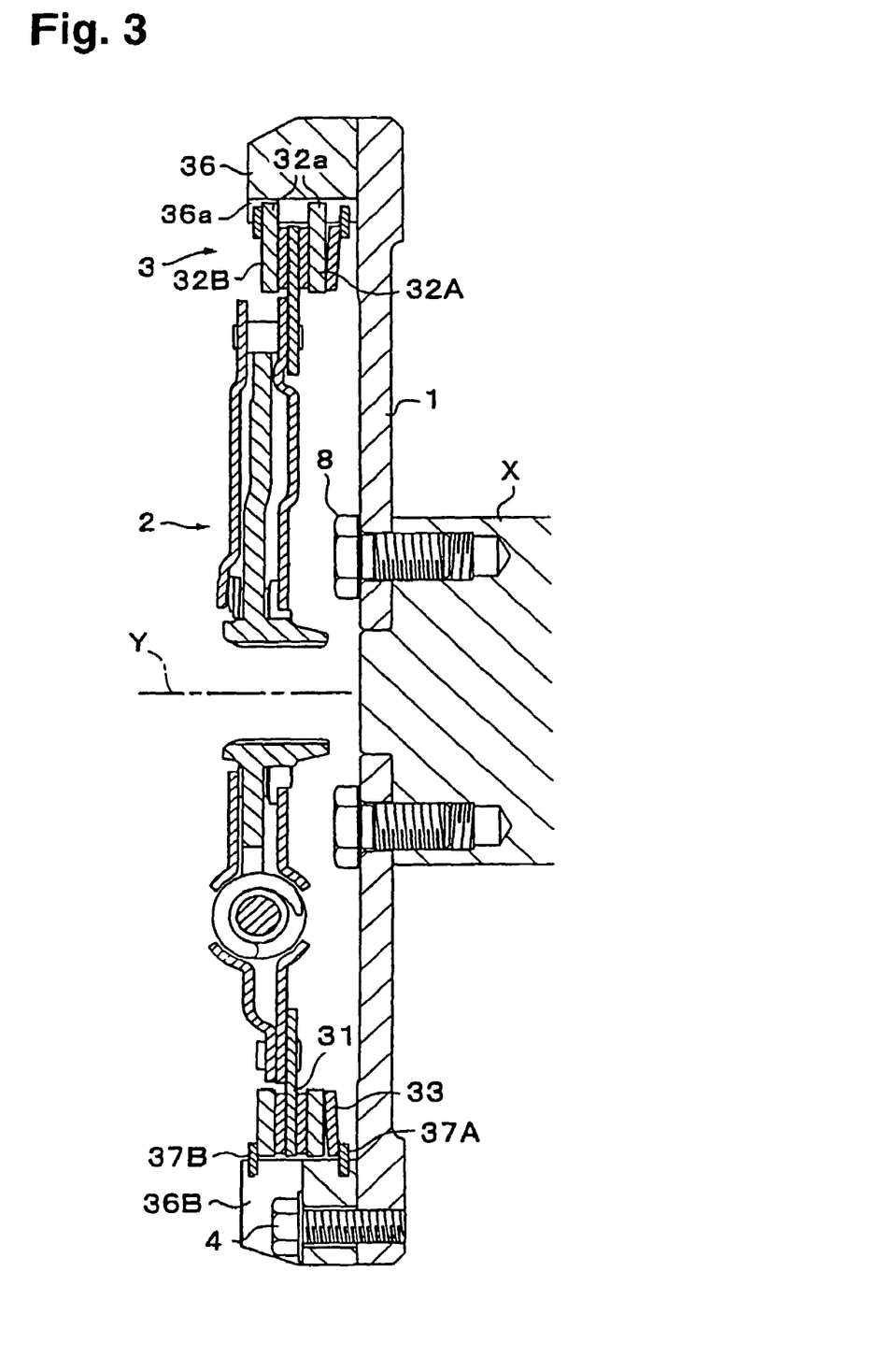
FIG. 3 is a sectional view in the axial direction taken along line 5-5 in FIG. 4, showing a damper unit with a torque limiter according to a second embodiment, as installed onto an engine output shaft.
Figure 4:
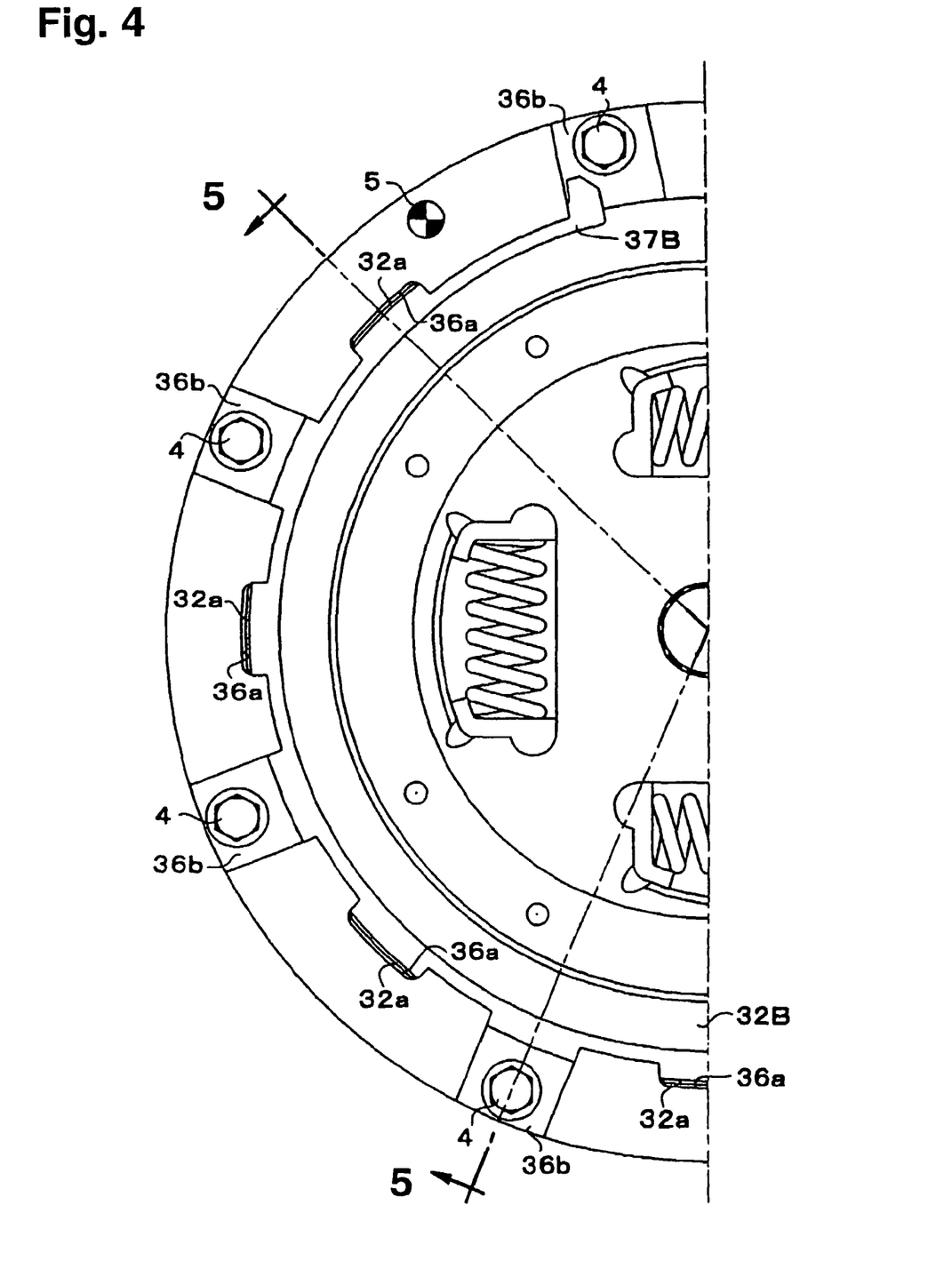
FIG. 4 is a half front view showing the damper unit with the torque limiter according to the second embodiment, as seen from the power transmission system coupling side.

FIGS. 3 and 4 show a second embodiment of the invention. The second embodiment differs from the first embodiment only in the supporting structure of the plates 32A, 32B of the torque limiter 3. Therefore, only the differing components will be described.

As shown in FIGS. 3 and 4, a pair of the plates 32A, 32B are coupled with each other by an annular coupling member 36 which is separate from plates so that they do not rotate. Mounting means 4 for mounting onto the fly wheel 1 are provided on this coupling member 36. The coupling member 36 is a thick annular member having an outer diameter substantially equal to the outer diameter of the fly wheel 1. As shown in FIG. 4, eight rows of spline grooves 36a are formed at the same intervals in the circumferential direction in an inner periphery thereof. Eight bolt head accommodating grooves 36b are also formed in the middle of the formation portion of the spline groove 36a.

The pair of the plates 32A, 32B are annular plate members of substantially the same shape and size. Eight rows of spline teeth 32a, which are engaged with the spline grooves 36a in the aforementioned coupling member 36, are formed in an outer periphery thereof. Therefore, the pair of the plates 32A, 32B are prevented from being rotated by the spline engagement with the coupling member 36. The axial position of the pair of plates 32A, 32B is restricted by a pair of snap rings 37A, 37B which are embedded in two rows of grooves running across the spline groove 36a in the coupling member 36 and which correspond to the retainer of the first embodiment described above. Plate 32B is supported in the axial direction with its end face in contact with the snap ring 37B located outside, while plate 32A is supported in the axial direction with its end face in contact with the snap ring 37A located inside. The snap ring 37A forms the retainer through a disc-type spring 33, which is disposed behind the plate 32A as an urging means. Therefore, the axial length between the grooves for both the snap rings 37A, 37B is set so that a predetermined set load is applied to the spring 33. According to the second embodiment, the ridge side of the spline groove 36a in the coupling member 36 functions as an eccentricity preventing means in the stage of assembling the friction disc 31 and the torsion damper 2 fixed thereto.

The torsion damper 2 and the torque limiter 3 of the second embodiment are coupled with each other through the snap rings 37A, 37B so that they are not removed from each other, thus forming an assembly which can be handled as a integrated component. Then, centering of the plates 32A, 32B of the torque limiter 3 with respect to the fly wheel 1 (engine output shaft X) is performed through the knock pin 5 when the assembly is mounted on the fly wheel 1. The knock pin 5 is inserted through the coupling member 36 and the fly wheel 1. Centering of the friction disc 31 with respect to the shaft Y is performed in the same manner as in the first embodiment.

In the second embodiment, the same benefits can be obtained by combining the damper unit with the torque limiter as an assembly, as in the first embodiment. Particularly in the second embodiment, the coupling member 36 for assembling the damper unit with the torque limiter serves as the mounting member for mounting to the fly wheel 1. Further, the pair of plates 32A, 32B, which form the torque limiter 3, can be of the same components, so that the number of component types can be reduced.

FIGS. 5 to 8 show a third embodiment of the invention. According to the third embodiment, a pair of plates 32A, 38 are coupled with each other so that they do not rotate while one plate is engaged with the other plate. A mounting means 4 for mounting onto the fly wheel 1 is provided on the one plate 38. The third embodiment differs from the second embodiment in that the plate, designated in the second embodiment 32B, is integrated with the coupling member 36 as plate 38. Further, an applying means for applying a set load has a different configuration in the third embodiment. Therefore, only differing components will be described.

Figure 7:
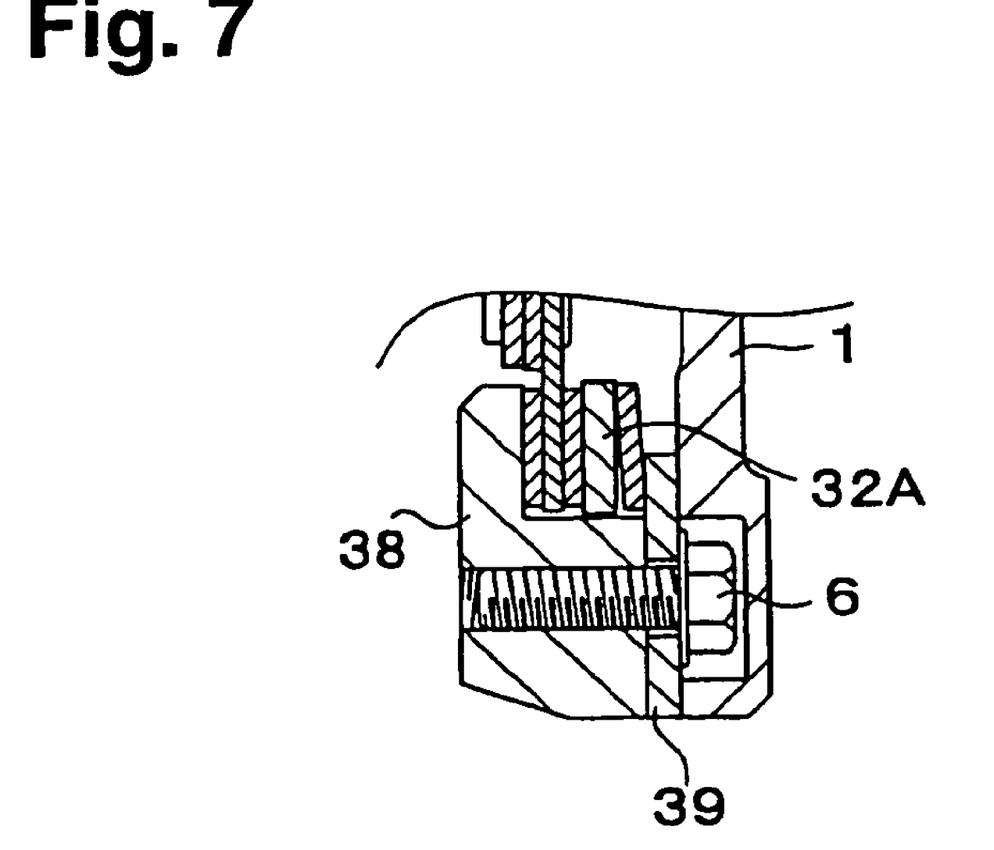
FIG. 7 is a sectional view of the damper unit with the torque limiter embodiment of FIG. 6 taken along line 7-7.
Figure 8:
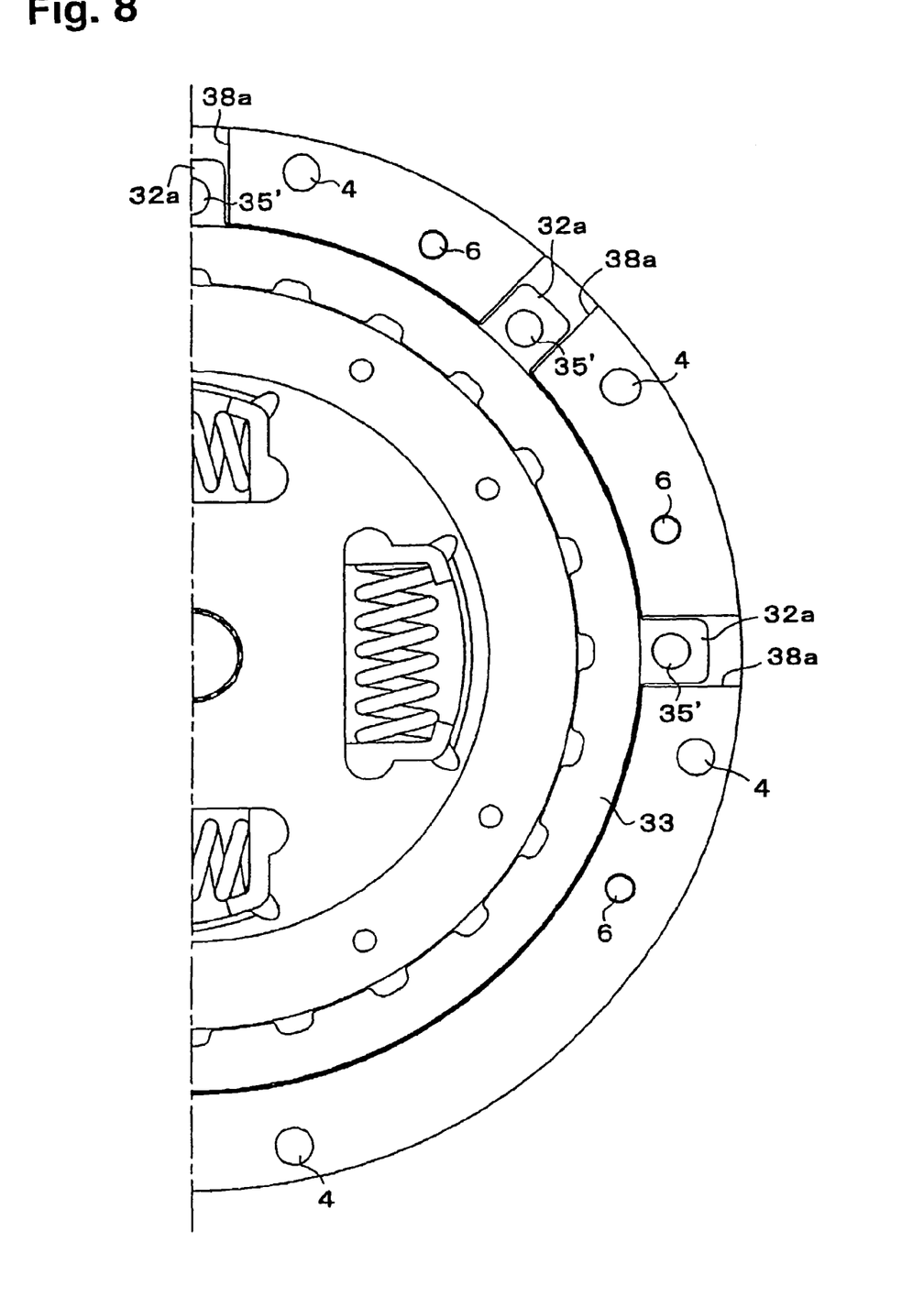
FIG. 8 is a sectional view of the damper unit with the torque limiter embodiment of FIG. 5 taken along the line 8-8.

As shown in FIGS. 5 to 8, the coupling member 38, which serves also as one plate, is a thick annular member having an outer diameter substantially equal to the outer diameter of the fly wheel 1. On the inner periphery side, there is a stepped hole having a difference in the diameter corresponding to the difference between the inner diameter and outer diameter of the friction material of the friction disc 31. Further, a plurality of grooves 38a are formed so as to extend radially in the side face which faces the fly wheel 1, as shown in FIG. 8.

Plate 32A has a plurality of protrusions 32a which protrude radially from an outer periphery thereof. These protrusions 32a are engaged with the grooves 38a in the coupling member 38 so as to prevent the coupling member 38 and the plate 32A from being rotated. On the other hand, the axial position of plate 32A is restricted by the annular plate member 39 attached to an end face of the coupling member 38. Plate 32A is supported in the axial direction such that it is in contact with the annular plate member 39. The annular plate member 39 forms a retainer through the disc-type spring 33, which is an urging means disposed behind. Accordingly, in the third embodiment, the axial length of the large-diameter hole portion in the coupling member 38 is set so as to apply a predetermined set load on the spring 33. Also, the large-diameter hole portion in the coupling member 38 functions as an eccentricity preventing means in the stage of assembling the friction disc and the torsion damper 2 fixed thereto.

Figure 5:
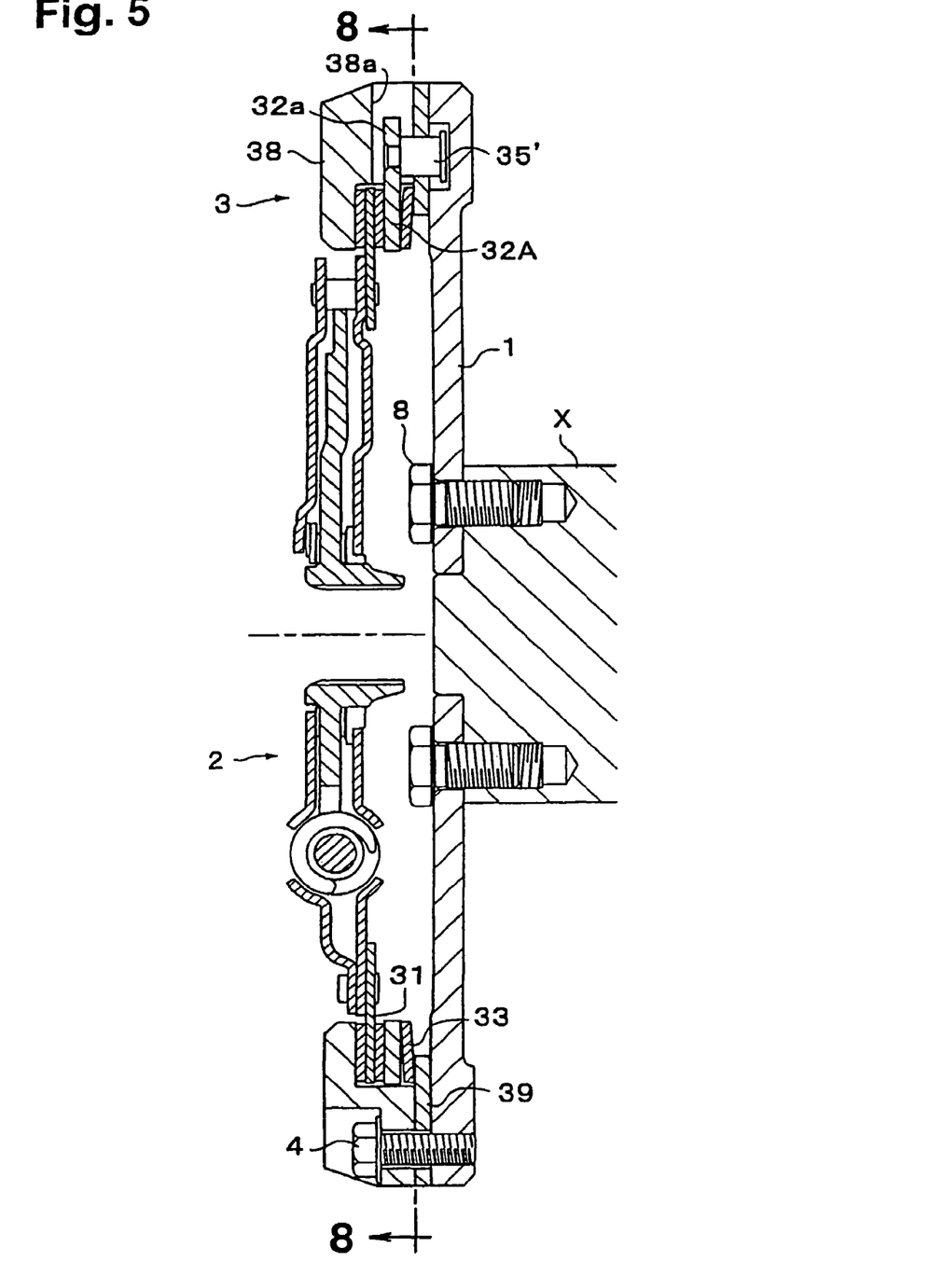
FIG. 5 is a sectional view in the axial direction showing a damper unit with a torque limiter according to a third embodiment, as installed onto an engine output shaft.
Figure 6:
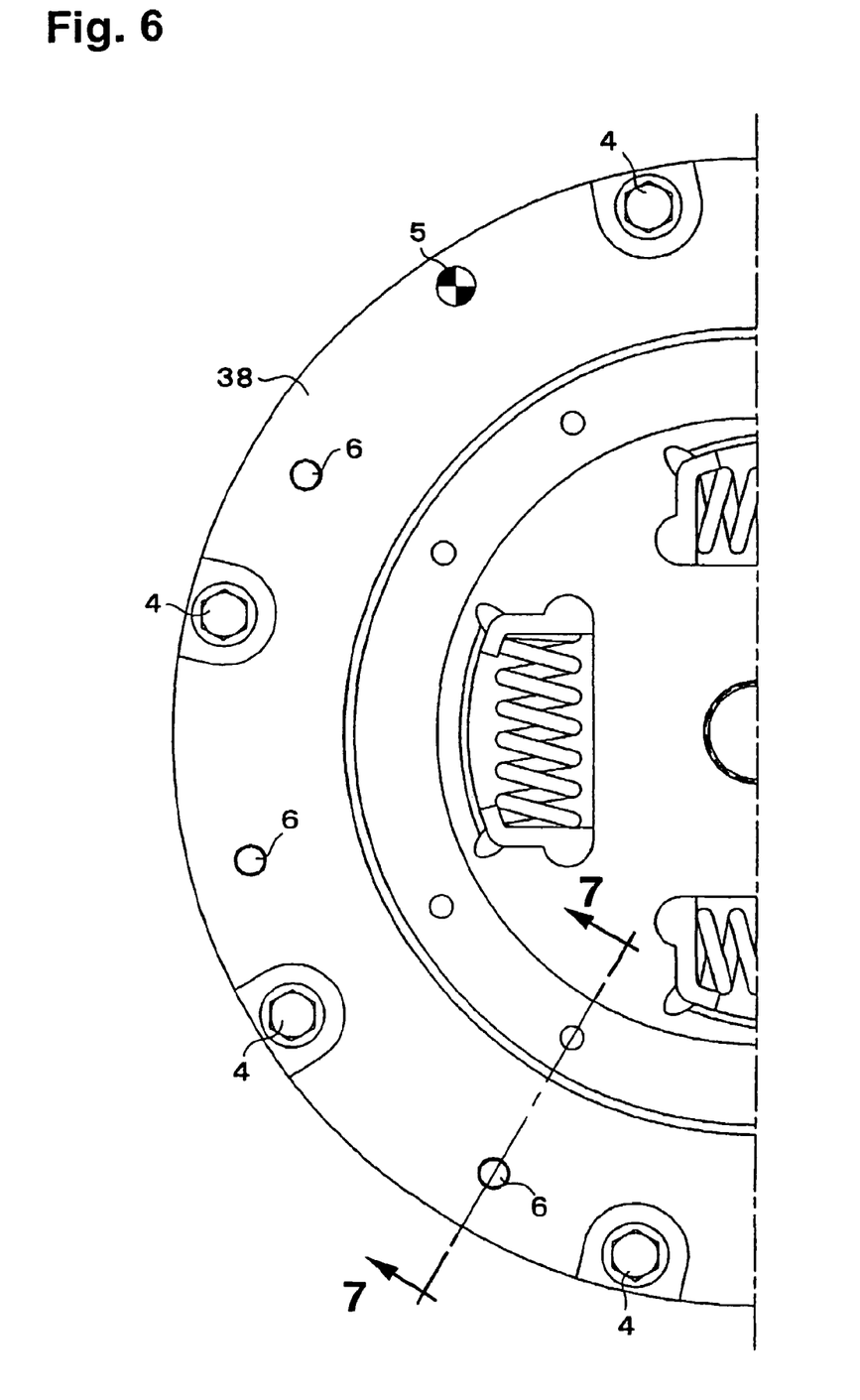
FIG. 6 is a half front view showing the damper unit with the torque limiter according to the third embodiment, as seen from the power transmission system coupling side.

The annular plate member 39, which forms the retainer in the third embodiment, is coupled with the coupling member 38 by tightening a bolt 6 to the fly wheel 1 from its contact side as shown in FIG. 7. A through hole for a pin 35' is formed in the annular plate member 39 at a position corresponding to the protrusion formation position on the other plate 32A as shown in FIG. 5. A tip of the pin 35', which passes through this hole, is caulked in a hole corresponding to the other plate 32A. Thus, the pin 35' serves as a sliding guide in the axial direction, which prevents the other plate 32A from being rotated around the axis.

In such a structure, the torsion damper 2 and the torque limiter 3 are coupled with each other by tightening the bolt 6 so that they are not removed from each other. They form an assembly which can be handled as an integrated component. Centering of the coupling member 38 of the torque limiter with respect to the fly wheel 1 is performed along with centering of the friction disc 31 with respect to the shaft Y in the same manner as in the second embodiment.

According to the third embodiment, the above-described benefits can be obtained by forming an assembly. In addition, the one plate which constitutes the torque limiter 3 serves as the coupling member 38 for coupling with the other plate 32A and as a mounting member for mounting the assembly onto the fly wheel 1. Thus, a coupling strength between the plates and a mounting strength onto the fly wheel 1 are improved. Further, because the weight of the coupling member 38 is large in the third embodiment, the inertial mass of the coupling member 38, and consequently the inertial mass of the torque limiter 3 are large. Thus, the torque limiter 3 may act as a fly wheel.

Figure 9:
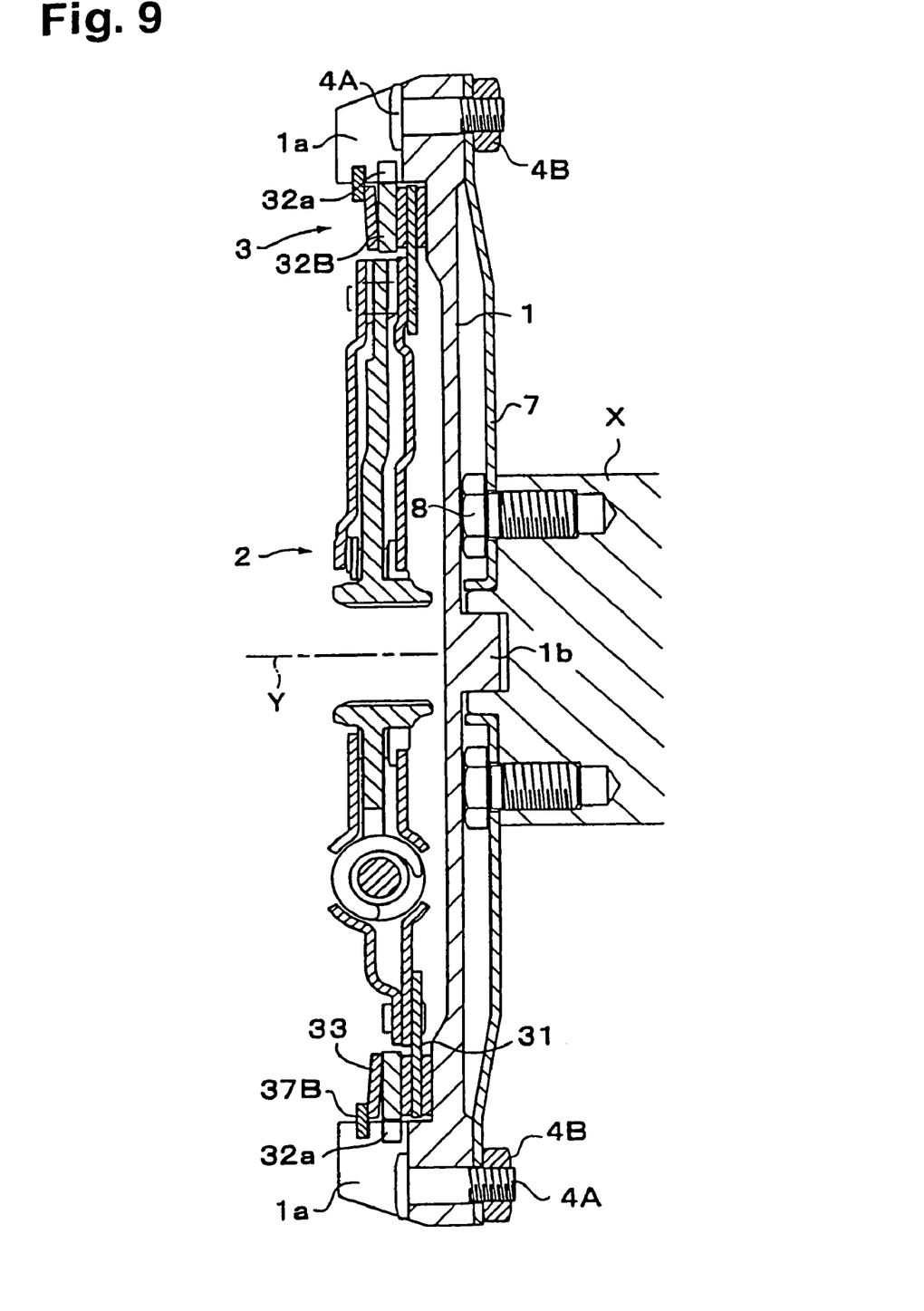
FIG. 9 is a sectional view in the axial direction showing a damper unit with a torque limiter according to a fourth embodiment, as installed onto an engine output shaft.
Figure 10:
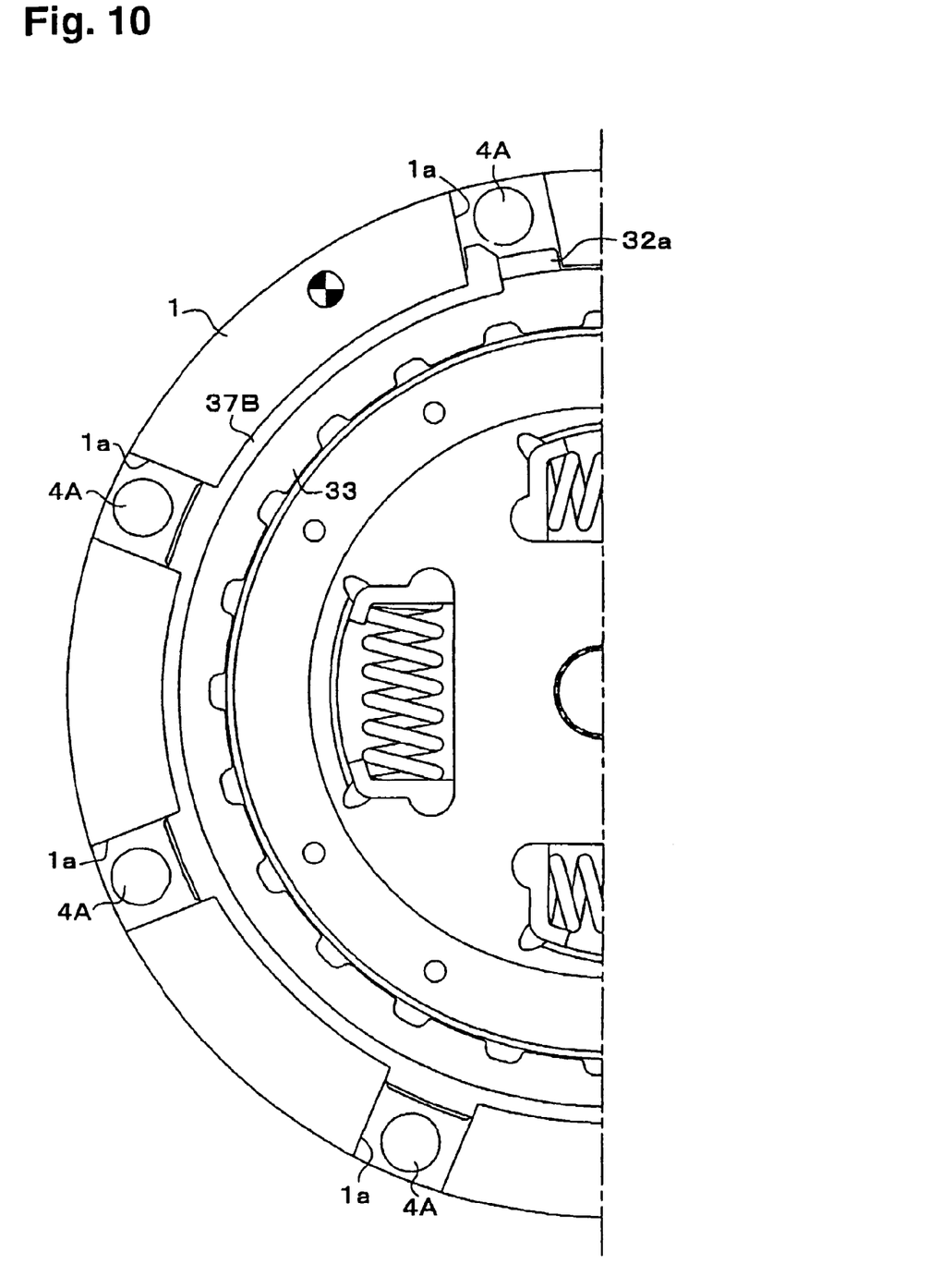
FIG. 10 is a half front view showing the damper unit with the torque limiter according to the fourth embodiment, as seen from the power transmission system coupling side.

FIGS. 9 and 10 show a fourth embodiment of the invention. The fourth embodiment differs from the above-described embodiments in that the damper with the torque limiter is an assembly formed by incorporating a damper 2 and a torque limiter 3 in a fly wheel 1. The damper 2 with the torque limiter 3 is coupled with an output shaft X of an engine through a drive plate 7. In the fourth embodiment, unlike the structure described in the third embodiment, the other plate is integrated with the coupling member and then are integrated with the fly wheel 1. In this structure, the thick portion on the outer periphery of the fly wheel 1 is extended rearward because of integration with the coupling member. Eight grooves 1a are formed at equal intervals in the circumferential direction by making notches in the radial direction on the extended portion as shown in FIG. 10.

The one plate 32B has spline teeth 32a which protrude from the outer periphery thereof. The number of the spline teeth is the same as that of the grooves 1a. Spline teeth 32a are engaged with the grooves 1a at the inner end side. The one plate 32B faces the fly wheel 1 across the friction disc 31 and is fixed by snap rings 37B on the inner periphery of the thick portion of the fly wheel 1 through the disc-type spring 33 disposed behind the plate 32B. Anchor bolts 4A are disposed in the thick portion of the fly wheel 1 as a mounting means for mounting onto the drive plate 7 such that each of head portions thereof is inserted in a groove 1a. In the fourth embodiment, because the drive plate 7 is a component made of thin stamped part or the like, it is likely to be deflected by the damper unit with the torque limiter, a heavy component, integrated with the fly wheel 1. Therefore, a boss portion 1b is formed to be fitted into a hole in an end portion of the engine output shaft X of the fly wheel 1.

In such a structure, the torsion damper 2 and the torque limiter 3 are coupled to the fly wheel 1 by the snap ring 37B so that they are not removed from each other. The formed assembly can then be handled as an integrated component incorporated in the fly wheel 1. In this configuration, centering of the plate of the torque limiter 3 with respect to the engine output shaft X is performed by fitting the boss portion 1b of the fly wheel 1, which is integrated with the plate of the torque limiter 3, into the hole in the end portion of the engine output shaft X upon installation of the assembly onto the drive plate 7. Centering of the friction disc with respect to the shaft X is performed in the same manner as in the above-described embodiments.

The above embodiment describes a configuration in which the bolt 4A embedded in the fly wheel 1 is screwed into the drive plate 7 by tightening the nut 4B. This installation process step assumes that there is no working space in the axial direction around the engine output shaft X for installing the damper unit with the torque limiter onto the drive plate 7. However, instead of employing this method, it is possible to employ an installation method in which the nut 4B is fixed to the drive plate 7 by welding or the like and the bolt is screwed from the side of the fly wheel 1. When employing the method for installation onto the drive plate 7 by tightening the nut 4B, it is possible to employ an installation method in which the damper unit with the torque limiter is installed onto the power transmission system by spline engagement first, and then, it is coupled with the engine.

As described above, according to the fourth embodiment, the fly wheel 1, which generally is a restriction on the order of installation of the torsion damper 2 and the torque limiter 3 onto the engine, is combined with the torsion damper 2 and the torque limiter 3 to form an assembly. Therefore, it is possible to eliminate the restriction on the order of installation onto the engine. As a result, the engine and power transmission system can be coupled with each other after the damper unit with the torque limiter including the fly wheel is installed on the power transmission system.

Although the invention has been described in detail in the four above embodiments, the invention is not limited to the above described embodiments, but may be realized by modifying the structure and/or installation order in various ways that are apparent to those skilled in the art without departing from the scope of the invention. For example, the order of installing the torsion damper and torque limiter onto the fly wheel and the power transmission shaft may be reversed to that of each of the embodiments. That is, the torsion damper may be coupled to the fly wheel, while the torque limiter may be coupled with the power transmission shaft.

What is claimed is:

1. A method of assembling a damper unit which is interposed between an output member of an engine and a power transmission shaft, the damper unit comprises a torque limiter including a pair of plates, a friction member, and an urging device that presses at least one of the pair of plates so that the friction member is sandwiched by the pair of plates, the method comprising:

forming an assembly by coupling, with a set load, the torque limiter to a torsion damper; and coupling the assembly to the output member of the engine, wherein:

the pair of plates are coupled to each other such that the pair of plates do not rotate relative to each other but are able to move relative to each other in an axial direction, the urging device presses the at least one of the pair of plates in the axial direction, the torque limiter is structured to release an excessive torsion force through slippage between shafts under a predetermined set load constantly applied, and the urging device presses the pair of plates in a fixed state such that the urging device cannot move in the axial direction to release.

2. The method of claim 1, wherein the output member comprises a fly wheel and an output shaft of the engine, further comprising:

coupling the assembly to the flywheel coupled to the output shaft of the engine.

3. The method of claim 1, wherein the output member comprises a drive plate and an output shaft of the engine and the assembly comprises the torque limiter, the torsion damper and a fly wheel, further comprising:

coupling the assembly to the output shaft of the engine through the drive plate.

4. The method of claim 3, wherein coupling the assembly comprises coupling the assembly to the output shaft of the engine by coupling the fly wheel to the output shaft of the engine through the drive plate.

5. The method of claim 1, wherein the pair of plates includes a first plate and a second plate, the friction member is fixed to the torsion damper, the urging device includes a spring, and the damper unit further includes a retainer and pins, further comprising:

forming the assembly by sandwiching the friction member, the first plate and the spring between the second plate and the retainer and by restricting a length between the second plate and the retainer by the pins.

6. The method of claim 1, wherein the pair of plates includes a first plate and a second plate, the friction member is fixed to the torsion damper, the urging device includes a spring and the damper unit further includes an annular member and a pair of snap rings, further comprising:

forming the assembly by sandwiching the spring, the second plate engaging with the annular member, the friction member and the first plate engaging with the annular member between the pair of snap rings fixed to the annular member.

7. The method of claim 1, wherein the pair of plates includes a first plate and a second plate, the friction member is fixed to the torsion damper, the urging device includes a spring and the damper unit further includes a retainer, further comprising:

forming the assembly by sandwiching the friction member between the first plate and the second plate and by engaging the first plate and the second plate and by arranging the spring between the first plate and the retainer and by restricting a length between the first plate and the retainer.

8. The method of claim 1, wherein the friction member is fixed to the torsion damper by a flat disk shaped member.

9. The method of claim 1, wherein all of the flat disk shaped member is flat.

* * * * *